(12) United States Patent
Baumeister

(10) Patent No.: US 7,156,639 B2
(45) Date of Patent: Jan. 2, 2007

(54) DEVICE FOR PRODUCING FILAMENTS

(75) Inventor: Michael Baumeister, Troisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 342 days.

(21) Appl. No.: 10/866,641

(22) Filed: Jun. 10, 2004

(65) Prior Publication Data

US 2004/0265415 A1    Dec. 30, 2004

(30) Foreign Application Priority Data

Jun. 13, 2003    (EP) .................................. 03013506

(51) Int. Cl.
*D01D 5/084* (2006.01)
(52) U.S. Cl. .................. 425/192 S; 425/464; 425/466; 425/382.2
(58) Field of Classification Search ............ 425/192 S, 425/382.2, 464, 466
See application file for complete search history.

(56) References Cited

U.S. PATENT DOCUMENTS 4,743,191 A * 5/1988 Chao .......................... 425/190
5,147,197 A * 9/1992 Hodan et al. ............ 425/192 S
5,344,297 A * 9/1994 Hills ........................ 425/131.5
5,397,227 A * 3/1995 Hodan et al. ............. 425/192 S
5,935,291 A * 8/1999 Kim et al. ..................... 65/495

FOREIGN PATENT DOCUMENTS

EP    0 677 600    10/1995
EP    1 304 401    4/2003
EP    0 626 471    11/2004

* cited by examiner

*Primary Examiner*—Joseph S. Del Sole
(74) *Attorney, Agent, or Firm*—Andrew Wilford

(57) ABSTRACT

A device for producing filaments, in particular, from a thermoplastic polymer, wherein the filaments emerge from the spinneret openings of a spinneret plate. A distribution device is provided for distributing the molten polymer being supplied over a preliminary spinning width. At least one exchangeable distribution plate with several distribution openings that are distributed over the spinning width is arranged downstream of the distribution device. The exchangeable spinneret plate is arranged downstream of the distribution plate, wherein said spinneret plate contains spinneret channels that are distributed over the final spinning width. The spinning width defined by the distribution openings is smaller or larger than the preliminary spinning width, and the preliminary spinning width can be reduced or enlarged to the final spinning width with the aid of the distribution plate. The desired final spinning width can be adjusted by exchanging the distribution plate.

11 Claims, 4 Drawing Sheets

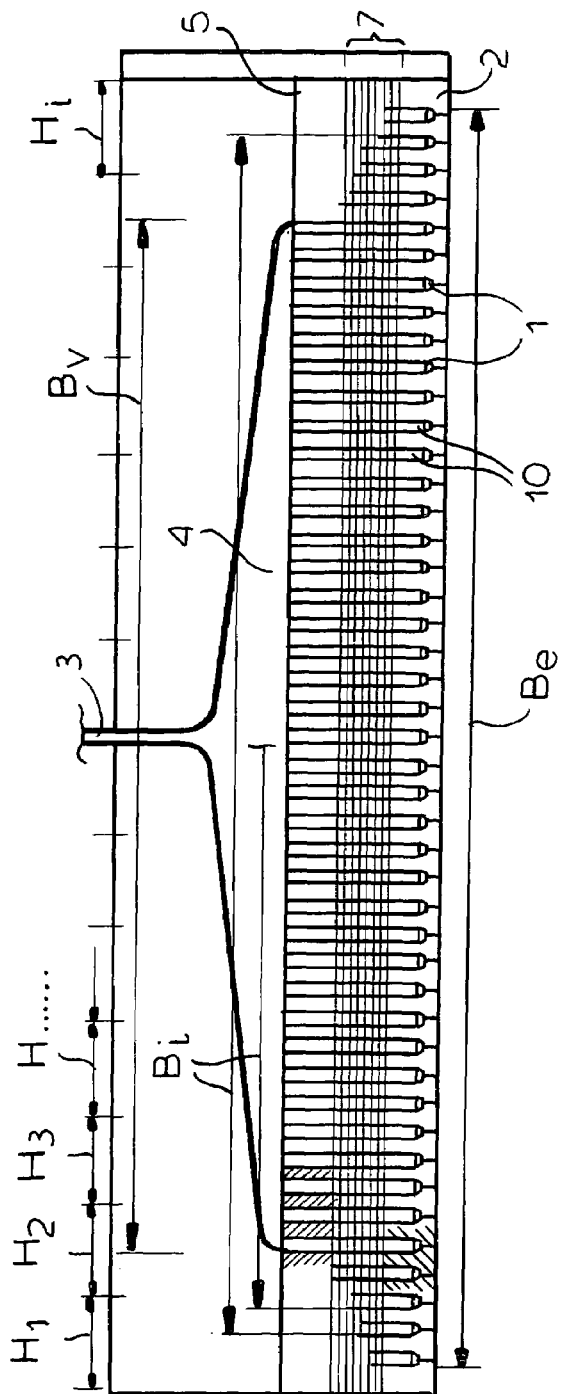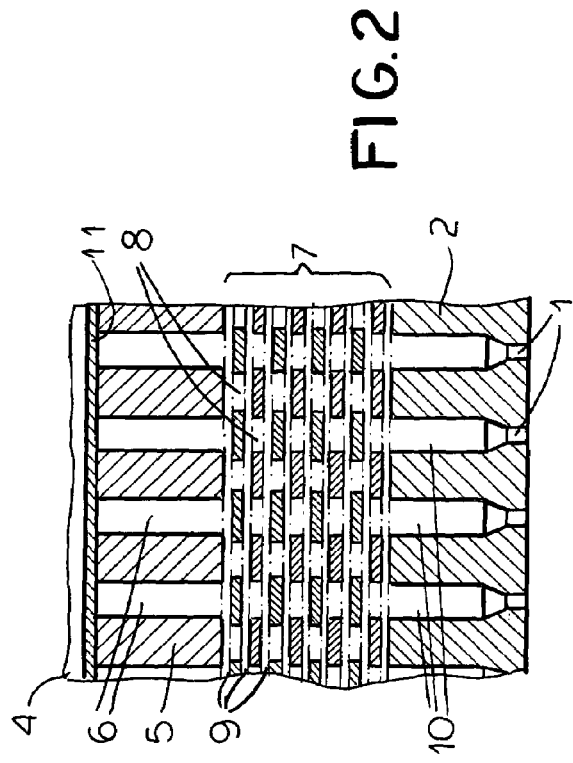

DEVICE FOR PRODUCING FILAMENTS

FIELD OF THE INVENTION

The present invention relates to a device for producing filaments, in particular, from a thermoplastic polymer, wherein the filaments emerge from the spinneret openings of a spinneret plate in the form of at least one filament row that extends over a spinning width. The invention pertains, in particular, to a device for manufacturing spunbond fabrics from filaments consisting of a thermoplastic polymer. The scope of the invention includes embodiments in which the filaments are placed on a conveying device, preferably on a traveling screen.

BACKGROUND OF THE INVENTION

The width of a product that consists of spun polymeric filaments placed on the conveying device depends on the spinning width, i.e., the width of a filament row emerging from the spinneret plate or the width of filament rows emerging from the spinneret plate. In the following description, the term conveying direction refers to the conveying direction of a conveying device for the filaments or the spunbond fabric consisting thereof, respectively, i.e., this term refers to the direction that extends transverse to the spinning width.

Devices for producing filaments and for manufacturing spunbond fabrics from filaments are normally designed for a certain product width or spunbond web width. The device components are adapted to this product width. During the course of the manufacture of spunbond fabrics for hygienic purposes, the spunbond web usually is cut into a series of narrow blanks over its width such that only relatively small residual trimmings are accumulated. In the manufacture of spunbond fabrics for various technical applications, large quantities of waste may be accumulated depending on the number and the width of the sections to be cut. In such instances, it is practical to adjust the width of the web being manufactured or the spinning width, respectively.

It is common practice to adjust the spinning width on so-called segmented devices. These known devices consist of several distribution devices that are arranged in a row over the spinning width and realized in the form of smaller coat hanger-type distributors that are respectively provided with separate viscous pumps arranged upstream thereof. Separate spinnerets may be respectively arranged downstream of the coat hanger-type distributors and arranged in a row that extends over the spinning width. The adjustment of the spinning width is realized by switching individual viscous pumps or individual segments of the device on or off. However, this is associated with the significant disadvantage that the polymer remaining in the deactivated segment breaks down over time and can lead to an accumulation of impurities in the openings or channels of the segment. This causes long-term interruptions in the operation of the device and affects the quality of the continuous material being produced.

OBJECTS OF THE INVENTION

The object of the invention is to provide a spinning device in which the spinning width can be adjusted easily and consistently and in which the aforementioned disadvantages are eliminated.

SUMMARY OF THE INVENTION

According to the invention, this object is attained with a device for producing filaments from a thermoplastic polymer, with the filaments emerging from the spinneret openings of a spinneret plate in the form of at least one filament row that extends over a spinning width, wherein a distribution device (distributor) is provided in order to distribute the supplied molten polymer over a preliminary spinning width, wherein at least one replaceable or exchangeable distribution plate with several distribution openings that are distributed over the spinning width is arranged downstream of the distribution device, with said distribution openings being provided for accommodating the molten polymer arriving from the distribution device, wherein an exchangeable or replaceable spinneret plate is arranged downstream of the distribution plate, with said spinneret plate containing spinneret channels and assigned spinneret openings that are distributed over the final spinning width, and wherein the spinning width defined by the distribution openings is smaller or larger than the preliminary spinning width, with the preliminary spinning width being reduced or enlarged to the final spinning width with the aid of the distribution plate, and with the desired final spinning width being adjustable by exchanging the distribution plate.

In the following description, the term "spinning width" refers to the total width of a row of filaments emerging from the device and consequently the width of the row of assigned spinneret openings. In this context, this term refers to the so-called final spinning width. However, the term spinning width also refers to the width, over which the molten polymer supplied via openings and channels extends. Consequently, the size or width of one row of distribution openings in a distribution plate defines the spinning width assigned to this distribution plate. The spinning width changes from the preliminary spinning width (at the end of the distribution device) to the spinning width of the distribution plates and ultimately to the final spinning width of the spinneret openings.

According to one preferred embodiment, only one distribution device is provided with respect to the spinning width, wherein only one viscous pump is preferably arranged upstream of this distribution device. The scope of the invention, in principle, also includes embodiments, in which two or more distribution devices are arranged adjacent to one another over the spinning width. In this case, a separate viscous pump is arranged upstream of each distribution device. In the context of the invention, it is important that molten polymer continuously flows through the distribution device or the distribution devices and all distribution openings of the distribution plate or the distribution plates during the operation of the device. In other words, the invention provides that, in contrast to the measures known from the state of the art, segments of the device are no longer switched off in order to adjust the spinning width. On the contrary, the basic idea of the invention consists of adjusting the spinning width by exchanging the distribution plates and the spinneret plate or by suitably combining distribution plates. This can be easily achieved while simultaneously eliminating the disadvantages described above with reference to the state of the art.

The scope of the invention also includes embodiments, in which several filament rows are respectively produced in succession over the spinning width, namely in the conveying direction or transverse to the spinning width, respectively. It goes without saying that successively arranged rows of spinneret openings need to be provided for this purpose.

According to the invention, it would also be conceivable to configure the spinneret openings of adjacent rows such that they are offset relative to one another.

According to one preferred embodiment that is of particular importance in the context of the invention, the distribution device is realized in the form of a coat hanger-type distributor. Coat hanger-type distributors for molten polymers are generally known from the state of the art. In a coat hanger-type distributor, a feed channel that initially is relatively narrow referred to the spinning width is gradually widened, in this case, to the preliminary spinning width in order to achieve a uniform flow profile at the outlet.

As mentioned above, the invention makes it possible to adjust the desired spinning width by choosing and installing the distribution plates and the spinneret plate accordingly. It is practical that the distribution openings of the distribution plates are arranged vertically or perpendicular to the distribution plate surface, and that the distribution openings end in distribution channels that lead to a widening or reduction of the spinning width on the inlet side. The design of the distribution openings and distribution channels needs to result in a uniform flow profile at the outlet. The size or the width of one row of distribution openings defines the spinning width of the respective distribution plate. According to the invention, it is also possible that each distribution plate contains several rows of distribution openings that are successively arranged transverse to the spinning width or in the conveying direction, respectively.

According to one preferred embodiment of the invention, several exchangeable distribution plates are arranged downstream of the distribution device, wherein the respective spinning widths defined by the distribution openings of the individual distribution plates decrease from the distribution device to the spinneret plate. The preliminary spinning width is reduced to the final spinning width in this fashion. In this embodiment, the spinning width is reduced from distribution plate to distribution plate and ultimately to the spinneret plate.

According to another preferred embodiment of the invention, several exchangeable distribution plates are arranged downstream of the distribution device, wherein the respective spinning widths defined by the distribution openings of the individual distribution plates increase from the distribution device to the spinneret plate. The preliminary spinning width is widened or enlarged to the final spinning width in this fashion. Consequently, the spinning width increases from distribution plate to distribution plate and ultimately to the spinneret plate in this case.

The scope of the invention also includes embodiments, in which adjacent, stacked distribution plates contain distribution openings that are offset referred to the spinning width. In this context, the term stacked refers to the distribution plates being arranged on top of one another in the flow direction of the molten polymer or on top of one another between the distribution device and the spinneret plate, respectively.

According to one preferred embodiment that is of particular importance in the context of the invention, a distribution plate contains at least one distribution channel that extends over at least part of the spinning width, wherein said distribution channel connects at least some of the distribution openings of this distribution plate to one another. The scope of the invention also includes embodiments, in which the distribution channel connects the distribution openings that are arranged in a row over the spinning width. It is preferred that the distribution channel extends over the entire spinning width of the distribution plate and connects the entire row of distribution openings of this distribution plate. A distribution channel preferably is arranged horizontally or perpendicular to the distribution openings. The scope of the invention also includes embodiments, in which a distribution channel of a distribution plate directly borders on an adjacent distribution plate.

This applies to at least some of the distribution plates. A distribution channel that borders on an adjacent distribution plate preferably connects at least part of the row of distribution openings of the adjacent distribution plate, particularly the entire row of distribution openings of this adjacent distribution plate.

The scope of the invention also includes embodiments, in which a distribution plate contains several adjacent rows of distribution openings. In this case, each row of distribution openings preferably extends over the spinning width of the respective distribution plate. It is preferred that the distribution openings of two rows that are arranged adjacent to one another in the conveying direction are configured such that they are offset relative to one another. In one particularly preferred embodiment of the invention, the distribution openings of each row are connected to one another by a distribution channel.

It is preferred to arrange a perforated plate (screen plate or screen support plate) with channel-like perforations for the molten polymer between the distribution device and a distribution plate. This perforated plate serves for supporting a screen (filter layer, filter screen) and is also referred to as a "screen support plate" in the English language.

According to one particularly preferred embodiment of the invention, several heating zones for the distribution device are additionally provided over the width of the distribution device, wherein each heating zone can be heated separately. It is preferred that each heating zone is assigned a heating device that can be separately adjusted to a certain heating temperature. The viscosity or flow speed of the molten polymer in the device according to the invention can be influenced in a surprisingly effective fashion with the aid of these heating zones and heating devices.

In the device according to the invention, it is possible to carry out very simple and consistent adjustments of various (final) spinning widths without causing interruptions in the operation of the device over time or compromising the quality of the produced articles. The above-described disadvantages of devices known from the state of the art are effectively eliminated. According to the invention, the molten polymer always flows through and consequently flushes all distribution openings, distribution channels and spinneret openings during the operation of the device. Consequently, impurities are effectively prevented from depositing in these openings and channels. It should also be emphasized that the device according to the invention is suitable for monofilaments, as well as bi-component filaments and multicomponent filaments.

BRIEF DESCRIPTION OF THE DRAWING

The above and other objects, features, and advantages will become more readily apparent from the following description, reference being made to the accompanying drawing in which:

FIG. 1 is a section through a device according to the invention in a first operating state;

FIG. 2, is a detail of FIG. 1

SPECIFIC DESCRIPTION

Figure 3:
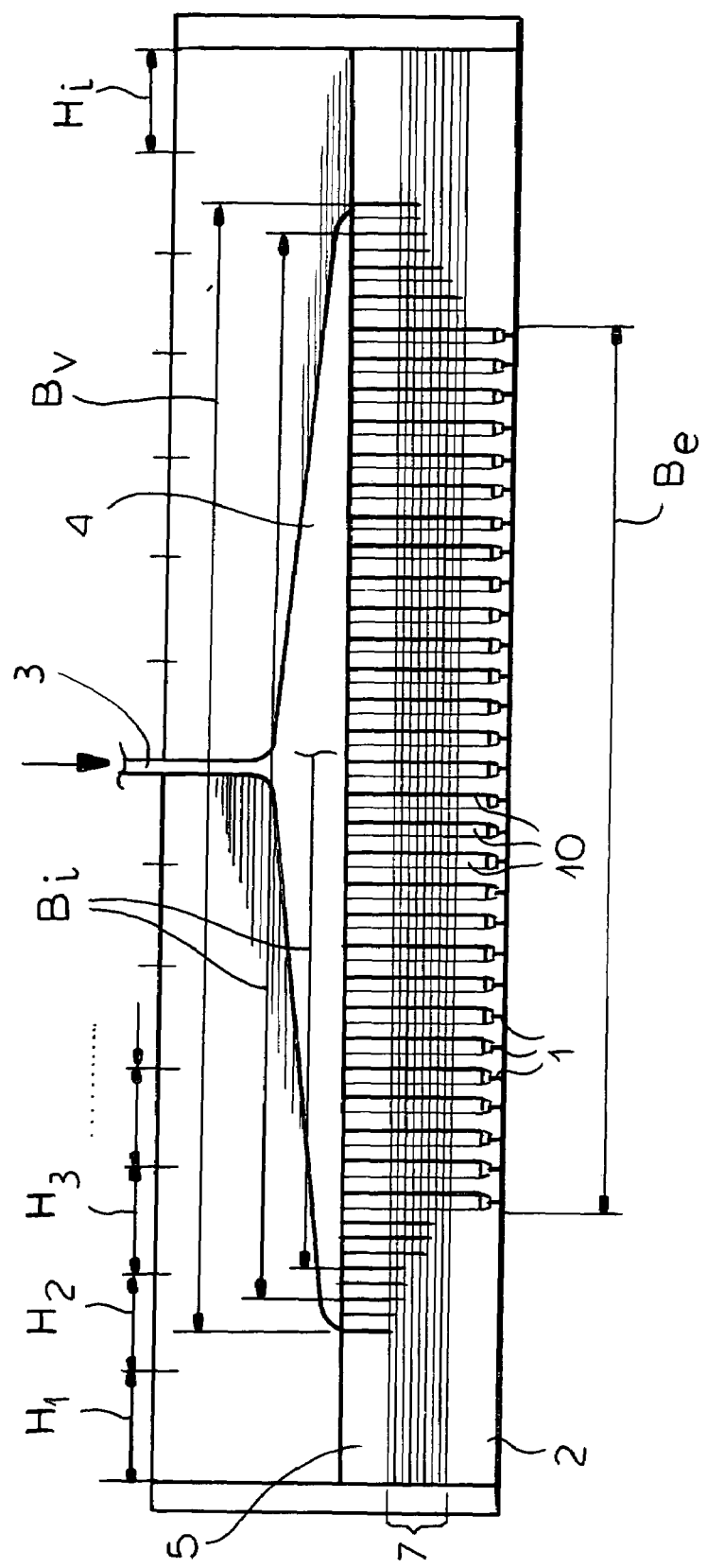
FIG. 3 is a section similar to FIG. 1 in a second operating state.

The drawing shows a device for producing filaments from a thermoplastic polymer. In the embodiment shown, these filaments emerge from the spinneret openings 1 of a spinneret plate 2 in the form of several filament rows that extend over a spinning width $B_e$.

The molten polymer for the filaments to be spun is initially conveyed from an extruder 1 (not shown) to a feed channel 3 by means of a viscous pump (not-shown). The feed channel 3 leads into a distribution device 4 that is realized in the form of a coat hanger-type distributor in this embodiment (FIGS. 1 and 2) and serves for distributing the supplied molten polymer over a preliminary spinning width $B_v$.

According to FIGS. 1–3, this distribution device 4 has the cross-sectional shape of a coat hanger with an ensuing throttle zone such that a gradual widening to the preliminary spinning width $B_v$ is achieved.

In the embodiment according to FIGS. 1–3, a perforated plate 5 (screen plate or screen support plate) is initially arranged downstream of the distribution device 4. This perforated plate contains channel-type holes 6 for the molten polymer which are distributed over the preliminary spinning width $B_v$, and wherein the perforated plate serves for supporting a screen 11. A perforated plate 5 of this type is also referred to as a "screen support plate".

Figure 4:
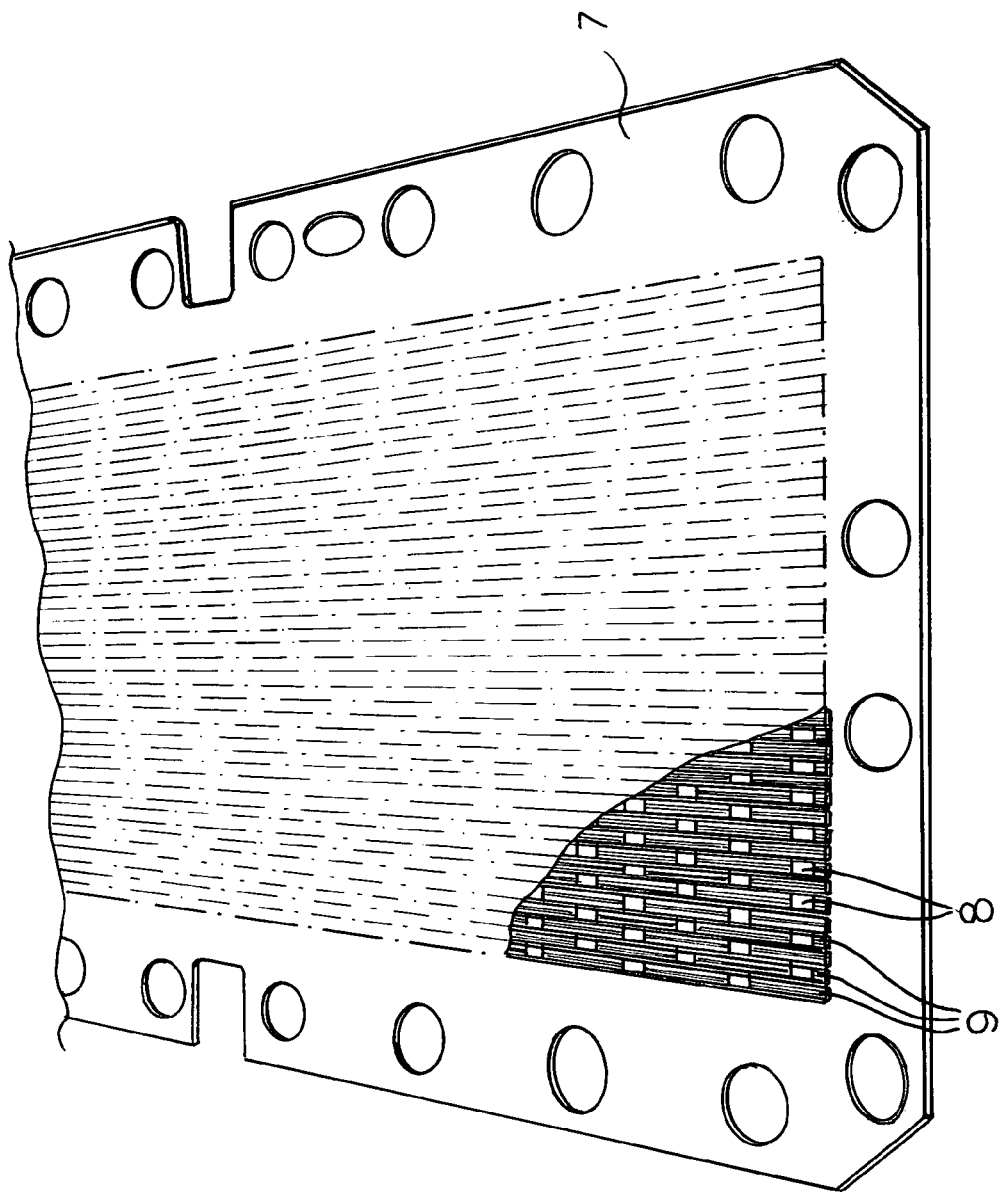
FIG. 4, is a perspective view of a portion of a distribution plate according to the invention.
Figure 5:
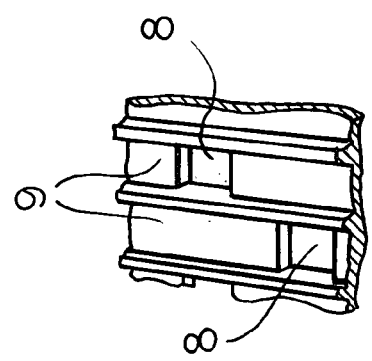
FIG. 5 is a detail of FIG. 4.

In the embodiment according to FIGS. 1–3, a set of exchangeable distribution plates 7 is arranged downstream of the distribution device 4 and the perforated plate 5. The distribution plates 7 contain distribution openings 8 for accommodating the molten polymer. One respective row of distribution openings 8 is illustrated in each distribution plate 7 in FIGS. 1 and 3. The size or width of one row of distribution openings 8 defines a spinning width $B_i$; for each distribution plate 7. In the preferred embodiment shown, each distribution plate 7 contains several rows of distribution openings 8 that are arranged adjacent to one another transverse to the spinning width. In this respect, we refer to FIGS. 4 and 5. FIG. 4 shows that the distribution openings 8 of adjacent rows of a distribution plate 7 are configured such that they are offset relative to one another.

According to FIGS. 1–3, the distribution openings 8 of the rows of adjacent, stacked distribution plates 7 which lie on top of one another are offset relative to one another in the direction of the spinning width $B_i$. When comparing FIGS. 1–5 one can ascertain that each distribution plate 7 contains distribution channels 9 that extend over the spinning width $B_i$, wherein each distribution channel 9 connects the distribution openings 8 of one row to one another. In the preferred embodiment according to FIGS. 1 and 3, a distribution channel 9 directly borders on an adjacent distribution plate 7 in at least the majority of distribution plates 7. In other words, this adjacent distribution plate 7 forms a wall of the adjacent distribution channel 9. In this practical embodiment, the distribution channel 9 connects the row of distribution openings 8 of the adjacent distribution plate 7. Due to this measure, all distribution openings 8 and all distribution channels 9 of the distribution plates 7 are connected to one another in the preferred embodiment according to FIGS. 1 and 3.

Figure 6:
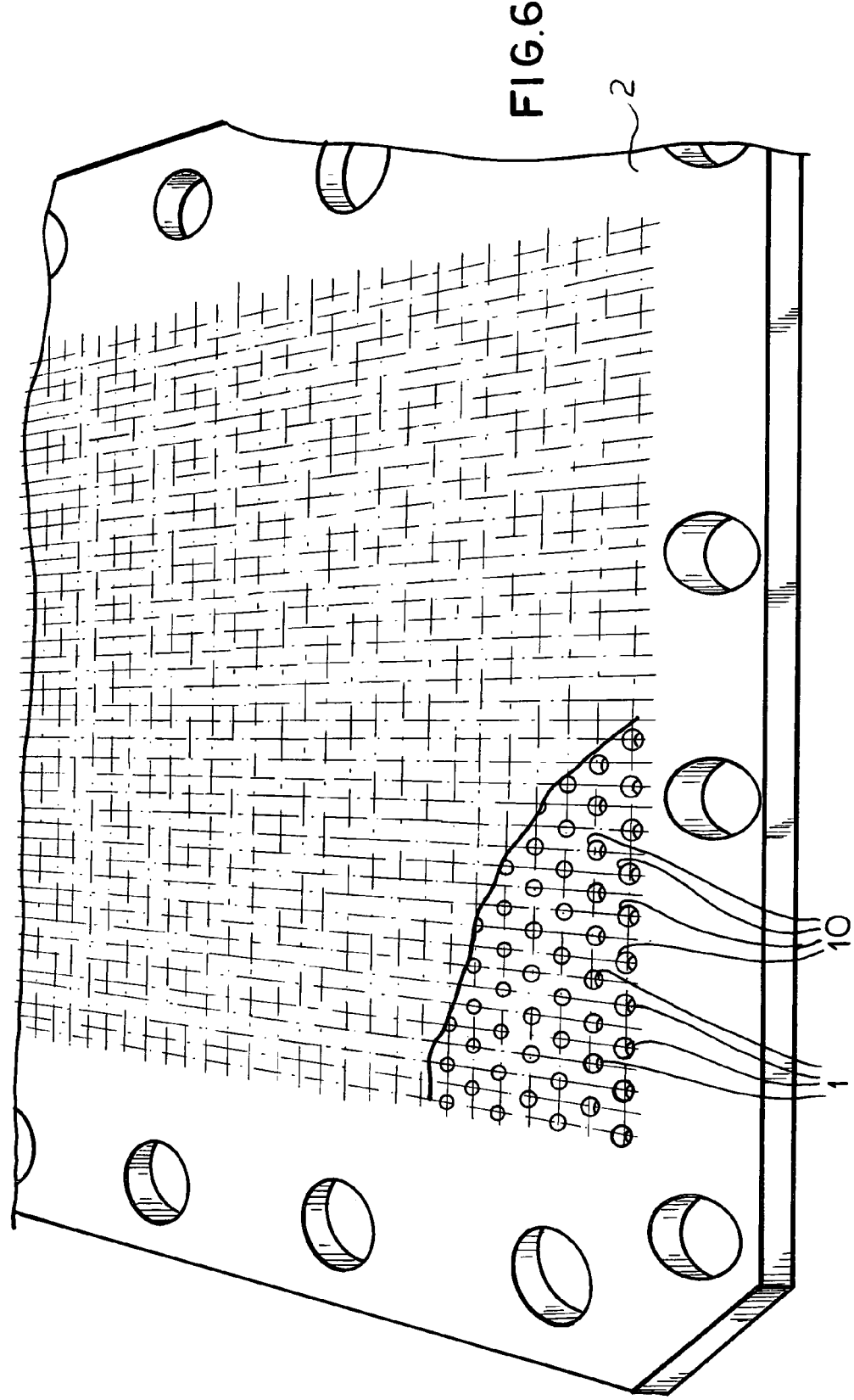
FIG. 6 is a fragmentary perspective view of a spinneret plate for the device according to the invention.

An exchangeable spinneret plate 2 is arranged downstream of the distribution plates 7. Spinneret plate 2 contains spinneret channels 10 with assigned spinneret openings 1 which are distributed over the final spinning width $B_e$. FIG. 6 shows a spinneret plate with spinneret channels 10 and spinneret openings 1, respectively. Several rows of spinneret channels 10 and spinneret openings 9 are arranged in succession transverse to the final spinning width $B_e$. The spinneret channels 10 and the spinneret openings 1 of adjacent rows are offset relative to one another in this embodiment.

In the operating state of the device shown in FIG. 1, several exchangeable distribution plates 7 are arranged downstream of the distribution device 4, wherein the respective spinning widths $B_i$ defined by the distribution openings 8 of the individual distribution plates 7 increase from the distribution device 4 to the spinneret plate 2. The preliminary spinning width By is enlarged or widened to the final spinning width $B_e$ in this fashion. This means that the spinning width $B_i$ increases from distribution plate 7 to distribution plate 7 and ultimately to the spinneret plate 2.

In the operating state of the device shown in FIG. 3, several exchangeable distribution plates 7 are also arranged downstream of the distribution device 4, wherein the respective spinning widths $B_i$ defined by the distribution openings 8 of the individual distribution plates 7 decrease from the distribution device 4 to the spinneret plate 2. The preliminary spinning width $B_e$ is decreased or reduced to the final spinning width $B_e$ in this fashion. This means that the spinning width $B_i$ decreases from distribution plate 7 to distribution plate 7 and ultimately to the spinneret plate 2.

FIGS. 1 and 3 show that all distribution openings 8 and distribution channels 9 are connected to one another, and that the molten polymer always flows through and flushes all distribution openings 8 and distribution channels 9 during the operation of the device. The device according to the invention operates without having to switch off any device segments.

According to a particularly preferred embodiment, as well as the embodiment shown in FIGS. 1 and 3, several heating zones $H_1, H_2, H_3, \ldots H_i$ are provided over the width of the distribution device 4. The respective heating zones $H_i$ can be heated separately. For this purpose, it is practical to assign at least one separately adjustable heating device to each heating zone $H_i$.

I claim:

1. A device for producing filaments across a filament-spinning width, comprising:

a distributor connectable to a source of a molten polymer for distributing said molten polymer over a provisional spinning width which can be greater than or less than said filament-spinning width;

at least one replaceable distribution plate located downstream of said distributor and provided with a multiplicity of distribution openings in a path of the molten polymer delivered by said distributor and distributed over said filament-spinning width whereby the filament-spinning width can be greater than or less than said provisional spinning width and is selected for said device by selection of the replaceable distribution plate installed in the device; and a replaceable spinneret plate downstream of said distribution plate and formed with spinneret channels and spinneret orifices over said filament-spinning width and defining said filament-spinning width for emitting strands of the molten polymer forming respective filaments, whereby a spinning width $B_i$ defined by the distribution openings is smaller or larger than the provisional spinning width $B_v$ with the provisional spinning width $B_v$ being reduced or enlarged to a final spinning width $B_e$ corresponding to the filament-spinning width by selective replacement of said distribution plates.

2. The device defined in claim 1 wherein said distributor is a coat-hanger distributor.

3. The device defined in claim 1 wherein a plurality of replaceable distribution plates are provided between said distributor and said spinneret plate and wherein respective spinning widths $B_i$ defined by the distribution openings of individual ones of said plurality of distribution plates decrease from said distributor to said spinneret plates to reduce the provisional spinning width $B_v$ to the final spinning width $B_e$.

4. The device defined in claim 1 wherein a plurality of replaceable distribution plates are provided between said distributor and said spinneret plate and wherein respective spinning widths $B_i$ defined by the distribution openings of individual ones of said plurality of distribution plates increase from said distributor to said spinneret plates to increase the provisional spinning width $B_v$ to the final spinning width $B_e$.

5. The device defined in claim 1 wherein a plurality of replaceable distribution plates are provided between said distributor and said spinneret plate and distribution openings of adjacent distribution plates are offset in a direction of the spinning widths $B_i$ defined by the distribution openings of said distribution plates.

6. The device defined in claim 1 wherein said distribution plate has at least one distribution channel that extends over at least part of the respective spinning width $B_i$ and connects at least some of the distribution openings to one another.

7. The device defined in claim 1 wherein a plurality of replaceable distribution plates are provided between said distributor and said spinneret plate and at least one of said distribution plates has at least one distribution channel that extends over at least part of the respective spinning width $B_i$ and connects at least some of the distribution openings to one another.

8. The device defined in claim 1 wherein said distribution plate has a plurality of rows of distribution openings arranged adjacent to one another.

9. The device defined in claim 1 wherein a plurality of replaceable distribution plates are provided between said distributor and said spinneret plate and each of said distribution plates has a plurality of rows of distribution openings arranged adjacent to one another.

10. The device defined in claim 1, further comprising a screen support plate with holes for the molten polymer disposed between said distributor and said distribution plate.

11. The device defined in claim 1 wherein a plurality of separately heatable heating zones for said distributor are provided over a width thereof.

\* \* \* \* \*